United States Patent
Royster, Jr.

(10) Patent No.: US 6,803,182 B1
(45) Date of Patent: Oct. 12, 2004

(54) GALLIUM COMPLEX COMPOSITION, PROCESS FOR DOPING SILVER HALIDE EMULSION GRAINS WITH GALLIUM COMPLEX COMPOSITION, AND GALLIUM-DOPED SILVER HALIDE EMULSION

(75) Inventor: Tommie L. Royster, Jr., Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/426,711

(22) Filed: Apr. 30, 2003

(51) Int. Cl.$^7$ ............................ G03C 1/08; C01G 15/00
(52) U.S. Cl. ........................................ 430/604; 423/495
(58) Field of Search ............................ 430/604; 423/495

(56) References Cited

U.S. PATENT DOCUMENTS 4,517,377 A * 5/1985 Isshiki et al. ................ 560/261

* cited by examiner

Primary Examiner—Hoa Van Le
(74) Attorney, Agent, or Firm—Andrew J. Anderson

(57) ABSTRACT

A gallium halide coordination complex is described of the formula (I):

$$[R_xNH_y]_3GaX_6$$

wherein R represents a lower alkyl group of from 1–3 carbon atoms; X is Cl, Br, or I; and x is from 1–3, y is from 1–3, and x+y=4. In a further aspect, a process for incorporating gallium in a silver halide emulsion is described comprising precipitating silver halide emulsion grains in a reaction vessel, wherein a gallium halide coordination complex of the formula (I) is introduced into the reaction vessel or formed in situ during precipitation of the silver halide grains. The isolation, or in-situ preparation, of a six coordinate gallium halide complex of Formula (I) in accordance with the invention has been found to enable the preparation of gallium doped silver halide emulsions with improved speed/grain performance.

17 Claims, No Drawings

GALLIUM COMPLEX COMPOSITION, PROCESS FOR DOPING SILVER HALIDE EMULSION GRAINS WITH GALLIUM COMPLEX COMPOSITION, AND GALLIUM-DOPED SILVER HALIDE EMULSION

FIELD OF THE INVENTION

This invention relates to gallium complex compositions which may be used in doping silver halide emulsions for use in silver halide photography. More specifically, the invention relates to new gallium halide complexes, a method for preparing silver halide emulsions incorporating gallium dopant, and to photographic elements which contain one or more of such emulsions.

BACKGROUND OF THE INVENTION

In the field of photosensitive materials, high sensitivity is generally desired, especially for photographs requiring a high shutter speed and photographs encountering difficulty in obtaining a satisfactory amount of light for exposure. However, highly sensitive photosensitive materials typically have coarse graininess. Silver halide emulsions comprising high percentages of tabular grains have been found to be useful in enabling improved speed/grain performance. Processes for producing tabular silver halide grains and techniques for utilizing the same are disclosed in, for example, U.S. Pat. Nos. 4,434,226, 4,439,520, 4,414,310, 4,433,048, 4,414,306 and 4,459,353. The advantages of the tabular silver halide grains are known in, for example, improving the relationship between sensitivity and graininess inclusive of enhancement of the efficiency of color sensitization by a spectral sensitizing dye. While tabular grain emulsions themselves provide advantageous speed/grain performance, further improvements in the relationship of sensitivity/graininess would be useful.

Various techniques can be used for enhancing the sensitivity of the silver halide emulsion. Research Disclosure, Vol. 176, December 1978, Item 17643, Section I, sub-section A, e.g, states that "sensitizing compounds, such as compounds of copper, thallium, lead, bismuth, cadmium and Group VIII noble metals, can be present during precipitation of silver halide" emulsions. The quoted passage is followed by citations to demonstrate the general knowledge of the art that metals incorporated as dopants in silver halide grains during precipitation are capable of acting to improve grain sensitivity.

The term "dopant" is employed herein to indicate any material within the rock salt face centered cubic crystal lattice structure of the central portion a silver halide grain other than silver ion or halide ion. The term "central portion" in referring to silver halide grains refers to that portion of the grain structure that is first precipitated accounting for up to 99 percent of total precipitated silver required to form the grains. The term "dopant band" is employed to indicate the portion of the grain formed during the time that dopant was introduced to the grain during precipitation process.

Research Disclosure, Vol. 308, December 1989, Item 308119, Section I, sub-section D, states that "compounds of metals such as copper, thallium, lead, mercury, bismuth, zinc, cadmium, rhenium, and Group VIII metals (e.g., iron, ruthenium, rhodium, palladium, osmium, iridium and platinum) can be present during the precipitation of silver halide" emulsions. The quoted passage is essentially cumulative with Research Disclosure 17643, Section 1, sub-section A, except that the metals have been broadened beyond sensitizers to include those that otherwise modify photographic performance when included as dopants during silver halide precipitation. Research Disclosure 308118, I-D proceeds to point out a fundamental change that occurred in the art between the 1978 and 1989 publication dates of these silver halide photography surveys, stating further: The metals introduced during grain nucleation and/or growth can enter the grains as dopants to modify photographic properties, depending on their level and location within the grains. When the metal forms a part of a coordination complex, such as a hexacoordination complex or a tetracoordination complex, the ligands can also be occluded within the grains. Coordination ligands, such as halo, aguo, cyano, cyanate, thiocyanate, nitrosyl, thionitrosyl, oxo, and carbonyl ligands are contemplated and can be relied upon to vary emulsion properties further.

The use of dopants in silver halide grains to modify photographic performance is further generally illustrated, e.g., by Research Disclosure, Item 38957,I. Emulsion grains and their preparation, D. Grain modifying conditions and adjustments, paragraphs (3)–(5). Photographic performance attributes known to be affected by dopants include sensitivity, reciprocity failure, and contrast.

With respect to the metal doping technique, using empirical techniques the art has over the years identified many specific dopants capable of increasing photographic speed. Keevert et al U.S. Pat. No. 4,945,035, e.g., was the first to teach the incorporation of a hexacoordination complex containing a transition metal and cyano ligands as a dopant in high chloride grains to provide increased sensitivity. Marchetti et al. U.S. Pat. No. 4,937,180 teaches the incorporation of hexacoordination complex containing rhenium, ruthenium, osmium, or iridium and cyano ligands in high bromide grains optionally containing iodide. Scientific investigations have gradually established that one general class of speed increasing dopants share the capability of providing shallow electron trapping sites. Olm et al U.S. Pat. No. 5,503,970 and Daubendiek et al U.S. Pat. Nos. 5,494,789 and 5,503,971, here incorporated by reference, as well as Research Disclosure, Vol. 367, November 1994, Item 36736, were the first to set out comprehensive criteria for a dopant to have the capability of providing shallow electron trapping (SET) sites.

There have been several patents or patent applications that have disclosed the practice of introducing Group 13 metals (e.g., Ga or In) during the precipitation of silver halides. The practice of using gallium as a shallow electron trapping (SET) dopant was disclosed in the above referenced patents to Olm et al. and Daubendiek et al., as well as U.S. Pat. No. 6,090,535. These disclosures state that $Ga^{3+}$ as a bare metal ion satisfies the silver halide HOMO and LUMO requirements for an SET dopant. The prior art thus teaches that a broad range of ligands can be used to prepare coordination complexes of gallium as SET dopants for silver halide emulsions. Specific ligands disclosed include halide ligands and strong field ligands that are required for forming octahedral Group 8 transition metal complexes as SET dopants. While $[Ga(NCS)_6]^{3-}$ is included among possible SET type dopants in the referenced prior art, the isolation or in-situ preparation of a gallium complex with octahedral coordination has not actually been demonstrated. Instead, where the use of gallium in photographic emulsion has been previously demonstrated, it has been in the form of simple salt such as $Ga(NO_3)_3$ (see, e.g., U.S. Pat. No. 5,348,848).

SUMMARY OF THE INVENTION

In one aspect this invention is directed towards a gallium halide coordination complex of the formula (I):

$$[R_xNH_y]_3GaX_6$$

wherein R represents a lower alkyl group of from 1–3 carbon atoms; X is Cl, Br, or I; and x is from 1–3, y is from 1–3, and x+y=4.

In a further aspect, this invention is directed towards a process for incorporating gallium in a silver halide emulsion comprising precipitating silver halide emulsion grains in a reaction vessel, wherein a gallium halide coordination complex of the formula (I) is introduced into the reaction vessel or formed in situ during precipitation of the silver halide grains. In another embodiment, this invention is directed towards silver halide emulsions formed by such process. In a still further aspect, this invention is directed towards a photographic element comprised of a support, and a silver halide emulsion layer coated on the support comprised of an emulsion obtained by the process of the invention.

As demonstrated in the examples herein, the isolation, or in-situ preparation, of a six coordinate gallium halide complex of Formula (I) in accordance with the invention has been found to enable the preparation of gallium doped silver halide emulsions with improved speed/grain performance.

DETAILED DESCRIPTION OF THE INVENTION

Alkylammonium gallium hexahalide coordination complexes of the formula (I) in accordance with the invention may be prepared by combining pure (e.g., sublimed) gallium trihalide of formula $GaX_3$ with three equivalents of an alkylammonium halide of the formula $[R_xNH_y]X$ (wherein as in formula (I) R represents a lower alkyl group of from 1–3 carbon atoms (e.g., methyl, ethyl or propyl, preferably methyl); X is Cl, Br, or I; and x is from 1–3 (preferably 2), y is from 1–3 (preferably 2), and x+y=4) under an inert atmosphere (e.g., nitrogen or argon), and heating the combined reactants to a temperature sufficient to promote the reaction (e.g., 80–100° C.) as demonstrated in the examples herein. Examples of complexes of Formula (I) which may be formed by such reaction scheme include:

I-1: $[(CH_3)NH_3]_3GaBr_6$
I-2: $[(CH_3)NH_3]_3GaCl_6$
I-3: $[(CH_3)NH_3]_3GaI_6$
I-4: $[(CH_3)_2NH_2]_3GaBr_6$
I-5: $[(CH_3)_2NH_2]_3GaCl_6$
I-6: $[(CH_3)_2NH_2]_3GaI_6$
I-7: $[(CH_3)_3NH]_3GaBr_6$
I-8: $[(CH_3)_3NH]_3GaCl_6$
I-9: $[(CH_3)_3NH]_3GaI_6$
I-10: $[(CH_3CH_2)NH_3]_3GaBr_6$
I-11: $[(CH_3CH_2)NH_3]_3GaCl_6$
I-12: $[(CH_3CH_2)NH_3]_3GaI_6$
I-13: $[(CH_3CH_2)_2NH_2]_3GaBr_6$
I-14: $[(CH_3CH_2)_2NH_2]_3GaCl_6$
I-15: $[(CH_3CH_2)_2NH_2]_3GaI_6$
I-16: $[(CH_3CH_2)_3NH]_3GaBr_6$
I-17: $[(CH_3CH_2)_3NH]_3GaCl_6$
I-18: $[(CH_3CH_2)_3NH]_3GaI_6$
I-19: $[(CH_3CH_2CH_2)NH_3]_3GaBr_6$
I-20: $[(CH_3CH_2CH_2)NH_3]_3GaCl_6$
I-21: $[(CH_3CH_2CH_2)NH_3]_3GaI_6$
I-22: $[(CH_3CH_2CH_2)_2NH_2]_3GaBr_6$
I-23: $[(CH_3CH_2CH_2)_2NH_2]_3GaCl_6$
I-24: $[(CH_3CH_2CH_2)_2NH_2]_3GaI_6$
I-25: $[(CH_3CH_2CH_2)_3NH]_3GaBr_6$
I-26: $[(CH_3CH_2CH_2)_3NH]_3GaCl_6$
I-27: $[(CH_3CH_2CH_2)_3NH]_3GaI_6$
I-28: $[((CH_3)_2CH)NH_3]_3GaBr_6$
I-29: $[((CH_3)_2CH)NH_3]_3GaC_6$
I-30: $[((CH_3)_2CH)NH_3]_3GaI_6$
I-31: $[((CH_3)_2CH)_2NH_2]_3GaBr_6$
I-32: $[((CH_3)_2CH)_2NH_2]_3GaCl_6$
I-33: $[((CH_3)_2CH)_2NH_2]_3GaI_6$
I-34: $[((CH_3)_2CH)_3NH]_3GaBr_6$
I-35: $[((CH_3)_2CH)_3NH]_3GaCl_6$
I-36: $[((CH_3)_2CH)_3NH]_3GaI_6$

Additional examples of complexes of Formula (I) may include mixtures of different halides X and mixtures of different alkyl groups R.

The gallium coordination complexes can be introduced during emulsion precipitation employing procedures well known in the art. The coordination complexes can be present in the dispersing medium present in the reaction vessel before grain nucleation. More typically the coordination complexes are introduced at least in part during precipitation through the halide ion jet or through a separate jet. Typical types of coordination complex introductions are disclosed by Keevert et al U.S. Pat. No. 4,945,035, and Marchetti et al. U.S. Pat. No. 4,937,180, each here incorporated by reference. Another technique for coordination complex incorporation is to precipitate Lippmann emulsion grains in the presence of the coordination complex followed by ripening the doped Lippmann emulsion grains onto host silver halide grains. While the coordination complexes of Formula (I) are preferably preformed prior to introduction into the reaction vessel, they may be formed in situ by addition of gallium trihalide and alkylammonium halide compounds separately to the reaction vessel.

The amount of gallium utilized in preparation of silver halide grains may be any amount that provides a desired improvement. A preferred range has been found to be between about $10^{-7}$ mole per mole of silver and about $10^{-3}$ mole per mole of silver added during precipitation of the silver halide grains, more preferably between about $10^{-6}$ mole and about $10^{-3}$ mole per mole of silver. The method and emulsion of the invention prepared thereby find the most preferred amount of the introduced gallium compound to be in a range of between about $10^{-5}$ mole and about $5\times10^{-4}$ mole per mole of silver for best performance. Following the accepted practice of the art, stated gallium dopant concentrations (as well as stated other dopant concentrations) are nominal concentrations—that is, they are based on the dopant and silver added to the reaction vessel prior to and during emulsion precipitation. In preferred embodiments of the invention, the gallium dopant complex is introduced or formed in situ during precipitation of at least a portion of the final 50 mole percent of the emulsion grain precipitation, more preferably during precipitation of at least a portion of the final 20 mole percent of the emulsion grain precipitation.

The emulsions prepared in accordance with the invention, apart from the inclusion of a gallium dopant coordination complex, can take any convenient conventional form. Silver halide emulsions contemplated include silver bromide, silver iodobromide, silver chloride, silver chlorobromide, silver bromochloride, silver iodochloride, silver iodobromochloride and silver iodochlorobromide emulsions, where, in the mixed halides, the halide of higher concentration on a mole basis is named last. All of the above silver halides form a face centered cubic crystal lattice structure and are distinguishable on this basis from high (>90 mole %) iodide grains, that are rarely used for latent image formation. The silver halide emulsion grains may take various crystal structures, such as tabular, cubic, and octahedral. The process and material of the invention find the preferred use in tabular grains, most preferably of a silver bromoiodide composition. Other conventional emulsion compositions which may be used in combination with the present invention and methods for their preparation are summarized in Research Disclosure, Item 308119, Section I, cited above and here incorporated by reference. Other conventional photographic features are disclosed in the following sections of Item 308119, here incorporated by reference:

II. Emulsion washing;
III. Chemical sensitization;
IV. Spectral sensitization and desensitization;
V. Brighteners;
VI. Antifoggants and stabilizers;
VII. Color materials;
VIII. Absorbing and scattering materials
IX. Vehicles and vehicle extenders
X. Hardeners
XI. Coating aids
XII. Plasticizers and lubricants
XIII. Antistatic layers
XIV. Methods of addition
XV. Coating and drying procedures
XVI. Matting agents
XVII. Supports
XVIII. Exposure
XIX. Processing
XX. Developing agents
XXI. Development modifiers
XXII. Physical development systems
XXIII. Image-transfer systems
XXIV. Dry development systems Emulsions prepared in accordance with the invention may be utilized with any silver halide photographic element. Typical of such materials are x-ray films, color negative photographic paper and film, black-and-white photographic paper and film, and reversal films. In a preferred embodiment, the emulsions are specifically contemplated for incorporation in camera speed color photographic films.

As used herein, the term "tabular" grain refers to silver halide grains having an aspect ratio of at least 2, where aspect ratio is defined as the equivalent circular diameter (ECD) of the major face of the grain divided by the grain thickness. The preferred tabular grains for utilization in the invention have an ECD of between about 0.2 and about 10 microns, more preferably between about 0.4 and about 5 microns. The grains preferably have a thickness of less than 0.3 micron, more preferably between about 0.03 and about 0.2 microns. Tabular grain emulsions with mean tabular grain thicknesses of less than about 0.07 $\mu M$ are herein referred to as "ultrathin" tabular grain emulsions. The preferred grains used in accordance with the invention also have an aspect ratio of at least 8, and an average tabularity (T) of greater than 25 (more preferably greater than 100), where the term "tabularity" is employed in its art recognized usage as $T=ECD/t^2$ where ECD is the average equivalent circular diameter of the tabular grains in micrometers and t is the average thickness in micrometers of the tabular grains. Tabularity increases markedly with reductions in tabular grain thickness. Preferably, any non-ultrathin tabular grain emulsions used in accordance with the invention have an average thickness of less than 0.3 micrometers for green or red sensitized emulsions, and 0.5 micrometers for blue sensitive emulsions.

Concerning tabular grains in general, to maximize the advantages of high tabularity it is generally preferred that tabular grains satisfying the stated criteria account for the highest conveniently attainable percentage of the total grain projected area of an emulsion, with at least 50% total grain projected area (%TGPA) being typical. For example, in preferred emulsions, tabular grains satisfying the stated criteria above account for at least 70 percent of the total grain projected area. In the highest performance tabular grain emulsions, tabular grains satisfying the criteria above account for at least 90 percent of total grain projected area.

Emulsions in accordance with preferred embodiments of the invention can be realized by chemically and spectrally sensitizing a gallium doped tabular grain emulsion in which the tabular grains have {111} major faces; contain greater than 50 mole percent bromide; and account for greater than 50 percent of total grain projected area. Preferably, such grains exhibit an average ECD of at least 0.7 $\mu$m, and an average thickness of less than 0.3 $\mu$m. The high bromide tabular grain emulsions preferably contain greater than 70 mole percent, and optimally at least 90 mole percent bromide, based on total silver. In one form the high bromide tabular grains can be silver bromide grains. It is also possible to include minor amounts of chloride ion in the tabular grains. Silver chloride, like silver bromide, forms a face centered cubic crystal lattice structure. Therefore, all of the halide not accounted for by bromide can be chloride, if desired. Chloride preferably accounts for no more than 20 mole percent, most preferably no more than 15 mole percent of total silver. Iodide can be present in concentrations ranging up to its saturation limit, but is usually limited to 20 mole percent or less, preferably 12 mole percent or less. These preferred tabular grains thus may include silver iodobromide, silver iodochlorobromide and silver chloroiodobromide grains, where the halides are named in their order of ascending concentration. Silver iodobromide grains represent a preferred form of high bromide tabular grains. For camera speed films it is generally preferred that the tabular grains contain at least 0.25 (more preferably at least 0.5 and most preferably at least 1.0) mole percent iodide, based on silver, most preferably in the range of from about 1 to 12 mole percent iodide.

The preparation of representative high bromide tabular grain emulsions which may be modified by the incorporation of gallium complex dopant in accordance with the invention include those described in the following references: *Research Disclosure*, Item 22534, January 1983, published by Kenneth Mason Publications, Ltd., Emsworth, Hampshire P010 7DD, England; Daubendiek et al U.S. Pat. No. 4,414,310; Solberg et al U.S. Pat. No. 4,433,048; Wilgus et al U.S. Pat. No. 4,434,226; Maskasky U.S. Pat. No. 4,435,501; Kofron et al U.S. Pat. No. 4,439,520; Yamada et al U.S. Pat. No. 4,647,528; Sugimoto et al U.S. Pat. No. 4,665,012; Daubendiek et al U.S. Pat. No. 4,672,027; Yamada et al U.S. Pat. No. 4,679,745; Daubendiek et al U.S. Pat. No. 4,693,964; Maskasky U.S. Pat. No. 4,713,320; Nottorf U.S. Pat. No. 4,722,886; Sugimoto U.S. Pat. No. 4,755,456; Goda U.S. Pat. No. 4,775,617; Ellis U.S. Pat. No. 4,801,522; Ikeda et al U.S. Pat. No. 4,806,461; Ohashi et al U.S. Pat. No. 4,835,095; Makino et al U.S. Pat. No. 4,835,322; Daubendiek et al U.S. Pat. No. 4,914,014; Aida et al U.S. Pat. No. 4,962,015; Ikeda et al U.S. Pat. No. 4,985,350; Piggin et al U.S. Pat. No. 5,061,609; Piggin et al U.S. Pat. No. 5,061,616; Tsaur et al U.S. Pat. No. 5,210,013; Black et al U.S. Pat.

No. 5,219,720; Kim et al U.S. Pat. No. 5,236,817; Brust U.S. Pat. No. 5,248,587; Tsaur et al U.S. Pat. No. 5,252,453; Kim et al U.S. Pat. No. 5,272,048; Delton U.S. Pat. No. 5,310,644; Black et al U.S. Pat. No. 5,334,495; Chaffee et al U.S. Pat. No. 5,358,840; Delton U.S. Pat. No. 5,372,927; Cohen et al U.S. Pat. No. 5,391,468; Maskasky U.S. Pat. No. 5,411,851; Maskasky U.S. Pat. No. 5,411,853; Maskasky U.S. Pat. No. 5,418,125; Delton U.S. Pat. No. 5,460,934;Wen U.S. Pat. No. 5,470,698; U.S. Pat. No. 5,250,403; Zola and Bryant EP 0 362 699; Daubendiek et al. U.S. Pat. No. 5,576,168.

Iodide can be uniformly distributed within the tabular grains. To obtain a further improvement in speed-granularity relationships it is preferred that the iodide distribution satisfy the teachings of Solberg et al U.S. Pat. No. 4,433,048. Silver iodobromide grain precipitation techniques, including those of U.S. Pat. No. 5,250,403 and EP 0 362 699, can be modified to silver bromide tabular grain nucleation and growth simply by omitting iodide addition, thereby allowing iodide incorporation to be delayed until late in the precipitation. U.S. Pat. No. 4,439,520 teaches that tabular grain silver iodobromide and bromide precipitations can differ solely by omitting iodide addition for the latter.

The tabular grains produced by the teachings of U.S. Pat. No. 5,250,403, EP 0 362 699 and U.S. Pat. No. 5,372,972 all have {111} major faces. Such tabular grains typically have triangular or hexagonal major faces. The tabular structure of the grains is attributed to the inclusion of parallel twin planes.

The tabular grains accounting for greater than 50 percent of total grain projected area of the tabular host grain emulsion preferably exhibit an average ECD of at least 0.7 $\mu$m. The advantage to be realized by maintaining the average ECD of at least 0.7 $\mu$m is demonstrated in Tables III and IV of U.S. Pat. No. 5,250,403. Although emulsions with extremely large average grain ECD'are occasionally prepared for scientific grain studies, for photographic applications ECD'are conventionally limited to less than 10 $\mu$m and in most instances are less than 5 $\mu$m. An optimum ECD range for moderate to high image structure quality is in the range of from 1 to 4 $\mu$m.

Preferred tabular grain emulsions are those in which grain to grain variance is held to low levels. U.S. Pat. No. 5,250,403 reports tabular grain emulsions in which greater than 90 percent of the tabular grains have hexagonal major faces. U.S. Pat. No. 5,250,403 also reports tabular grain emulsions exhibiting a coefficient of variation (COV) based on ECD of less than 25 percent and even less than 20 percent. Disproportionate size range reductions in the size-frequency distributions of tabular grains having greater than mean ECD's (hereinafter referred to as the >$ECD_{av}$ grains) can be realized by modifying the procedure for precipitation of the tabular grain emulsions in the following manner: Tabular grain nucleation is conducted employing gelatino-peptizers that have not been treated to reduce their natural methionine content while grain growth is conducted after substantially eliminating the methionine content of the gelatino-peptizers present and subsequently introduced. A convenient approach for accomplishing this is to interrupt precipitation after nucleation and before growth has progressed to any significant degree to introduce a methionine oxidizing agent. Any of the conventional techniques for oxidizing the methionine of a gelatino-peptizer can be employed, such as discussed in U.S. Pat. No. 5,576,168.

Increases in photographic speed can be realized when the tabular grains are chemically sensitized with conventional middle chalcogen (i.e., sulfur, selenium or tellurium) sensitizers or noble metal (e.g., gold) sensitizers. A general summary of these conventional approaches to chemical sensitization are contained in *Research Disclosure* December 1989, Item 308119, Section III. Chemical sensitization. U.S. Pat. No. 4,439,520 illustrates the application of these sensitizations to tabular grain emulsions. Tabular grains may receive during chemical sensitization a relatively small molar amount (i.e., from 0.5 to 7 mole percent, based on total silver, where total silver includes that in the host and epitaxy) of epitaxially deposited silver halide forming protrusions at selected sites on the tabular grain surfaces, such as described by U.S. Pat. Nos. 4,435,501 and 5,576,168 here incorporated by reference, which disclose improvements in sensitization by epitaxially depositing silver halide at selected sites on the surfaces of the host tabular grains. Further, any spectral sensitizers may be employed such as the various dyes which provide increased spectral sensitivity range to the silver halide grains.

Aside from the features of gallium dopant incorporation described above, emulsions employed in this invention and their preparation can take any desired conventional form. For example, in accordance with conventional practice, after an emulsion satisfying the requirements of the invention has been prepared, it can be blended with one or more other emulsions. Conventional emulsion blending is illustrated in *Research Disclosure*, Vol. 308, Item 308119, Section I, Paragraph I, the disclosure of which is here incorporated by reference.

Photographic elements formed in accordance with certain embodiments of the invention may utilize conventional peptizing materials and be formed on conventional base materials such as cellulose acetate, polyester and paper. Tabular grain emulsions for use in accordance with preferred embodiments of the invention may be used in any photographic elements, and are preferably used in multicolor elements which contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art.

A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers and subbing layers.

If desired, the photographic element can be used in conjunction with an applied magnetic layer as described in *Research Disclosure*, November 1992, Item 34390 published by Kenneth Mason Publications, Ltd., Dudley Annex, 12a North Street, Emsworth, Hampshire P010 7DQ, ENGLAND, and as described in Hatsumi Kyoukai Koukai Gihou No. 94-6023, published Mar. 15, 1994, available from the Japanese Patent Office. When it is desired to employ the inventive materials in a small format film, *Research Disclosure*, June 1994, Item 36230, provides suitable embodiments.

In the following discussion of suitable materials for use in the elements of this invention, reference will be made to *Research Disclosure*, September 1994, Item 36544, available as described above, which will be identified hereafter by the term "Research Disclosure". Sections hereafter referred to are Sections of the Research Disclosure.

Except as provided, elements containing silver halide emulsions in accordance with this invention can be either negative-working or positive-working as indicated by the type of processing instructions (i.e. color negative, reversal, or direct positive processing) provided with the element. Suitable methods of chemical and spectral sensitization are described in Sections I through V. Various additives such as UV dyes, brighteners, antifoggants, stabilizers, light absorbing and scattering materials, and physical property modifying addenda such as hardeners, coating aids, plasticizers, lubricants and matting agents are described, for example, in Sections II and VI through VIII. Color materials are described in Sections X through XIII. Scan facilitating is described in Section XIV. Supports, exposure, development systems, and processing methods and agents are described in Sections XV to XX. Certain desirable photographic elements and processing steps, particularly those useful in conjunction with color reflective prints, are described in Research Disclosure, Item 37038, February 1995.

The emulsions can be surface-sensitive emulsions, i.e., emulsions that form latent images primarily on the surfaces of the silver halide grains, or the emulsions can form internal latent images predominantly in the interior of the silver halide grains. The emulsions can be negative-working emulsions, such as surface-sensitive emulsions or unfogged internal latent image-forming emulsions, or direct-positive emulsions of the unfogged, internal latent image-forming type, which are positive-working when development is conducted with uniform light exposure or in the presence of a nucleating agent.

Photographic elements can be exposed to actinic radiation, typically in the visible region of the spectrum, to form a latent image and can then be processed to form a visible dye image. Processing to form a visible dye image includes the step of contacting the element with a color developing agent to reduce developable silver halide and oxidize the color developing agent. Oxidized color developing agent in turn reacts with the coupler to yield a dye.

With negative-working silver halide, the processing step described above provides a negative image. The described elements can be processed in the known Kodak C-41 color process as described in the British Journal of Photography Annual of 1988, pages 191–198. To provide a positive (or reversal) image, the color development step can be preceded by development with a non-chromogenic developing agent to develop exposed silver halide, but not form dye, and followed by uniformly fogging the element to render unexposed silver halide developable. Such reversal emulsions are typically sold with instructions to process using a color reversal process such as E-6. Alternatively, a direct positive emulsion can be employed to obtain a positive image.

Preferred color developing agents are p-phenylenediamines such as: 4-amino-N,N-diethylaniline hydrochloride, 4-amino-3-methyl-N,N-diethylaniline hydrochloride, 4-amino-3-methyl-N-ethyl-N-(2-methanesulfonamido-ethyl)aniline sesquisulfate hydrate, 4-amino-3-methyl-N-ethyl-N-(2-hydroxyethyl)aniline sulfate, 4-amino-3-(2-methanesulfonamido-ethyl)-N,N-diethylaniline hydrochloride and 4-amino-N-ethyl-N-(2-methoxyethyl)-m-toluidine di-p-toluene sulfonic acid.

Development is usually followed by the conventional steps of bleaching, fixing, or bleach-fixing to remove silver or silver halide, washing, and drying.

EXAMPLES

Example 1 (Invention)

Preparation of Dimethylammonium Gallium Hexabromide

Working in an Argon drybox, 17.35 g (137.7 mmol) of [Me$_2$NH$_2$]Br was weighed out and transferred to a 250 mL one neck flask with a stir bar. Then, 14.2 g (45.9 mmol) of GaBr$_3$ was transferred to the flask. The use of free flowing GaBr$_3$ crystals resulted in an initial exothermic reaction. Using sublimed GaBr$_3$, no reaction was observed at room temperature after combining the materials. The reaction flask was capped with an adapter to seal the flask under Argon. Outside of the drybox, the flask was placed into an oil bath heated to ~100° C. The colorless solution that formed was stirred at the oil bath temperature for 3–4 hrs before removing the heat and allowing the product to cool to RT. The product [Me$_2$NH$_2$]$_3$GaBr$_6$ was isolated as a colorless crystalline solid (eq 1).

$$3[Me_2NH_2]Br + GaBr_3 \rightarrow [Me_2NH_2]_3GaBr_6 \qquad (1)$$

Characterization of the final product was achieved through a combination of physical properties and analytical data. Through monitoring the reaction under vacuum in a sealed tube, unreacted [Me$_2$NH$_2$]Br was observed to sublime to the non-heated area of the tube. After 1 hour of remixing of any sublimed starting material, no additional sublimation was observed. This confirmed that any initially formed [Me$_2$NH$_2$]GaBr$_4$ had completely reacted with the excess [Me$_2$NH$_2$]Br to form [Me$_2$NH$_2$]$_3$GaBr$_6$. Gallium analysis of the product was consistent with the proposed formulation.

Example 2 (Comparison)

Preparation of Silver Iodobromide Tabular Grain Emulsion E-1

To a reaction vessel containing 4.55 liters of an aqueous solution with 0.40 percent by weight of oxidized gelatin, 82 g of a 5.345 M solution of NaBr was added at 40° C. Following a 2 min hold time, the temperature, pAg and pH set points were verified (T=40° C., pAg=10.3 and pH=5.8). The temperature was then adjusted to 65° C. before nucleation was carried out through the single-jet introduction of 0.42 M AgNO$_3$ to form 0.114 mole of silver bromide. This was followed by the addition of 16 g of 3.8 M (NH$_4$)$_2$SO$_4$, 48 g of 2.5 M NaOH, 52 g of 4M HNO$_3$ and 247 g of oxidized gelatin. Growth of the tabular grains was achieved through a double-jet precipitation process by introducing 3.0 M AgNO$_3$ and 3.0 M NaBr sub-surface in equal proportions. The pBr was controlled at a set point of 8.8 out to 68% of growth before adding 26 g of a 2.7 M KBr solution. Then, the pBr was adjusted to 9.4 by introducing the 3.0 M NaBr solution without AgNO$_3$. A Lippmann AgI suspension (3.7% of total silver) was added followed by a 2 min hold. After adjusting the pBr to 8.5, growth was continued while controlling the pBr at a set point of 8.1. At 95% growth a solution prepared from 2.5 mmol of Ga(NO$_3$)$_3$*XH$_2$O (200 μmol Ga/mol Ag) and 29 g of 3.0 M NaBr was introduced over a growth band of 1.2%. The combined flow-rate of the gallium solution and the main source of NaBr matched the flow-rate of the AgNO$_3$ solution. The last growth stage was completed with equal volumes of NaBr and AgNO$_3$.

The resulting emulsion was examined by optical microscopy techniques. The mean equivalent circular diameter of the emulsion was determined by a disc centrifuge technique. A coated reflectance technique was used to determine the grain thickness. The mean emulsion grain dimensions were 4.0 microns ECD×0.125 microns thickness.

Example 3 (Invention)

Preparation of Silver Iodobromide Tabular Grain Emulsion E-2

The emulsion precipitation procedure and conditions were the same as described for Example 2 Emulsion E-1, except that [Me$_2$NH$_2$]$_3$GaBr$_6$ obtained in accordance with Example 1 was used in place of Ga(NO$_3$)$_3$*X(H$_2$O) at the same concentration of 200 μmol Ga/mol Ag.

The mean emulsion grain dimensions as determined by the disc centrifuge and the coated reflectance techniques were 3.7 microns ECD×0.121 microns thickness.

Example 4

Comparison of Photographic Performance of Emulsions E-1 and E-2

Silver iodobromide tabular grain emulsions E-1 and E-2 were each red sensitized using the following finishing procedure (reported levels are relative to 1 mole of host emulsion): A sample of the emulsion was liquefied at 43° C. in a reaction vessel followed by the addition of 6.24 mmol of 1,3-Benzenedisulfonic acid, 4,5-dihydroxy (disodium salt), 100 mg of NaSCN and 25 mg of Benzothiazolium, 3-(3-((methylsulfonyl)amino)-3-oxopropyl)-, tetrafluoroborate(1-). The red sensitizing dyes Naphtho(1,2-d)thiazolium, 1-(3-sulfopropyl)-2-(2-((1-(3-sulfopropyl) naphtho(1,2-d)thiazol-2(1H)-ylidene)methyl)-1-butenyl), inner salt with N,N-diethyl ethanamine and Naphtho(1,2-d) thiazolium 2-(2-((5,6-dimethyl-3-(2-sulfoethyl)-2(3H)-benzoxazolylidene)methyl)-1-butenyl)-1-(3-sulfopropyl), inner salt with N,N,N',N'-tetramethylguanidine were added in a 1:10 mole ratio (~55% Dye coverage) followed by a 5 min and 25 min hold time respectively. Then, 14 μmol of 1-carboxymethyl-1,3,3-trimethyl-2thiourea (sodium salt) and 4.67 μmol of Au—1-[3-(2-sulfo)benzamidophenyl]-5-mercaptotetrazole were added as the sulfur and gold sensitizers. The emulsion was heated to 65° C. for 5 min then cooled to 43° C. before the addition of 5.8 mmol of (1,2,4)Triazolo(1,5-a)pyrimidin-7-ol, 5-methyl-(sodium salt) and 51 μmol of 1-(3-acetamidophenyl)-5-mercaptotetrazole.

Each sensitized emulsion was coated in a single emulsion layer coating structure along with an overcoat layer on a cellulose acetate photographic film support with Rem Jet™ back side antihalation layer. Component laydowns are provided in units of g/m$^2$.

Layer 1 (overcoat layer): Hardener 1,1'-(oxybis (methylenesulfonyl))bis-ethene dual coated (using 1.8% of total gelatin weight) with gelatin (2.69).
Layer 2 (emulsion layer): Red sensitized tabular emulsion E-1 or E-2 (silver at 1.08) dual coated with cyan dye forming coupler CC-1 (0.969) (net gel 2.42).

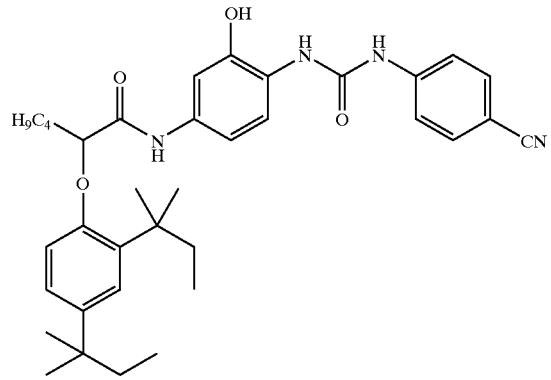

CC-1

Spectral exposures for the single layer coatings were made with 5500 K daylight using a 21-step granularity tablet with a Wratten 23A filter for 1/100 sec. The exposed strips were then developed in a C-41 process for 90 sec.

Relative Granularity, Relative Log Speed (measured at density 1.0 above minimum density), and maximum density (D-max) were measured, with the results indicated in Table 1 below. Granularity readings on the processed strips were made according to procedures described in the SPSE Handbook of Photographic Science and Engineering, edited by W. Thomas, pp. 934–939. Granularity readings at each step were divided by the contrast at the same step, and the minimum contrast normalized granularity reading was recorded. Contrast normalized granularity is reported in grain units (g.u.), in which each g.u. represents a 5% change. A positive change corresponds to a grainier image, and negative changes are desirable. Since the random dot model for granularity predicts that granularity is inversely proportional to the square root of the number of imaging centers (M. A. Kriss in The Theory of the Photographic Process, 4th Ed. T. H. James, ed. New York, Macmillan, 1977; p.625), and larger grains generally are needed to achieve higher speeds, it is generally accepted that for tabular emulsions, granularity will increase at a rate of ca. 7 g.u. for each gain of 30 log speed units (or correspondingly 1 g.u. for each 4.3 log speed increase) at constant silver coverage and photoefficiency.

TABLE 1

Experimental Results

| Emulsion | Relative Granularity | Relative Log Speed (Density 1.0 above Dmin) | Maximum Density |
|---|---|---|---|
| E-1 | 68 GU | 259 | 1.66 |
| E-2 | 66 GU | 265 | 1.81 |

The above results demonstrate that use of the gallium complex in accordance with the invention surprisingly provides an improvement in both granularity and the speed at density of 1.0 above D-min relative to use of the simple gallium nitrate salt.

Example 5

Multilayer Coating Format

A multilayer film structure which may be utilized with emulsions prepared in accordance with the invention is shown below, with structures of components immediately following. Component laydowns are provided in units of g/m$^2$. 1,1'-(oxybis(methylenesulfonyl))bis-ethene hardener is present at 1.6% of total gelatin weight. Antifoggants (including 4-hydroxy-6-methyl-1,3,3a,7-tetraazaindene), surfactants, coating aids, coupler solvents, emulsion addenda, sequesterants, lubricants, matte and tinting dyes are added to the appropriate layers as is common in the art. "Lippmann" refers to an unsensitized fine grain silver bromide emulsion of 0.05 μm diameter.

Layer 1 (Protective Overcoat Layer): gelatin (0.89).
Layer 2 (UV Filter Layer): silver bromide Lippmann emulsion (0.215), UV-1 (0.097), UV-2 (0.107), CFD-1 (0.009), and gelatin (0.699).
Layer 3 (Fast Yellow Layer): a blend of two blue sensitized (with a mixture of BSD-1 and BSD-2) tabular silver iodobromide emulsions (i) 2.7×0.13 micrometer, 4.1 mole % iodide (0.312) and (ii) 1.3×0.14 micrometer, 4.1 mole % iodide (0.312); yellow dye-forming coupler YC-1 (0.258), IR-1 (0.086), bleach accelerator releasing coupler B-1 (0.005) and gelatin (0.915).
Layer 4 (Slow Yellow Layer): a blend of three blue sensitized (all with a mixture of BSD-1 and BSD-2) tabular silver iodobromide emulsions (i) 1.3×0.14 micrometer, 4.1 mole % iodide (0.323), (ii) 0.8×0.14 micrometer, 1.5 mole % iodide (0.355), and (iii) 0.5×0.08 micrometer, 1.5 mole % iodide (0.182); yellow dye-forming couplers YC-1 (0.699) and YC-2 (0.430), IR-1 (0.247), IR-2 (0.022), bleach accelerator releasing coupler B-1 (0.005), and gelatin (2.30).
Layer 5 (Interlayer): OxDS-1 (0.075), A-1 (0.043), and gelatin (0.538).
Layer 6 (Fast Magenta Layer): a green sensitized (with a mixture of GSD-1 and GSD-2) silver iodobromide tabular emulsion, 1.3×0.13 micrometer, 4.5 mole % iodide (0.775); magenta dye-forming coupler MC-1 (0.102), masking coupler MM-1 (0.032), IR-3 (0.036), IR-4 (0.003) and gelatin (1.03).
Layer 7 (Mid Magenta Layer): a blend of two green sensitized (with a mixture of GSD-1 and GSD-2) silver iodobromide tabular emulsions (i) 0.8×0.12 micrometer, 4.5 mole % iodide (0.71) and (ii) 0.7×0.11 micrometer, 4.5 mole % iodide (0.151); magenta dye-forming coupler MC-1 (0.247), masking coupler MM-1 (0.118), IR-3 (0.027), IR-5 (0.024), and gelatin (1.45).
Layer 8 (Slow magenta layer): a blend of three green sensitized (all with a mixture of GSD-1 and GSD-2) silver iodobromide emulsions (i) 0.7×0.11 micrometer tabular, 4.5 mole % iodide (0.172), (ii) 0.5×0.11 micrometer tabular, 4.5 mole % iodide (0.29), and (iii) 0.28 micrometer cubic, 3.5 mole % iodide (0.29); magenta dye-forming coupler MC-1 (0.430), masking coupler MM-1 (0.108), IR-5 (0.031) and gelatin (1.52).
Layer 9 (Interlayer): YFD-1 (0.043), A-1 (0.043), OxDS-1 (0.081) and gelatin (0.538).
Layer 10 (Fast Cyan layer): red-sensitized tabular silver iodobromide emulsion E-2 (0.860); cyan dye-forming couplers CC-1 (0.199), IR-6 (0.043), IR-7 (0.059), masking coupler CM-1 (0.027), and gelatin (1.62).
Layer 11 (Mid Cyan Layer): a blend of two red-sensitized (both with a mixture of RSD-1, RSD-2, and RSD-3) silver iodobromide tabular emulsions (i) 1.2×0.11 micrometer, 4.1 mole % iodide (0.344) and (ii) 1.0×0.11 micrometer, 4.1 mole % iodide (0.430); cyan dye-forming coupler CC-1 (0.344), IR-2 (0.038), masking coupler CM-1 (0.016), and gelatin (1.13).
Layer 12 (Slow cyan layer): a blend of two red sensitized (both with a mixture of RSD-1, RSD-2, and RSD-3) tabular silver iodobromide emulsions (i) 0.7×0.12 micrometer, 4.1 mole % iodide (0.484) and (ii) 0.5×0.08 micrometer, 1.5 mole % iodide (0.646); cyan dye-forming coupler CC-1 (0.583), IR-7 (0.034), masking coupler CM-1 (0.011), bleach accelerator releasing coupler B-1 (0.086) and gelatin (1.92).
Layer 13 (Interlayer): OxDS-1 (0.075) and gelatin (0.538).
Layer 14 (Antihalation layer): Black Colloidal Silver (0.151), OxDS-1(0.081), and gelatin (1.61).
Support: annealed poly(ethylene naphthalate)

Chemical Structures

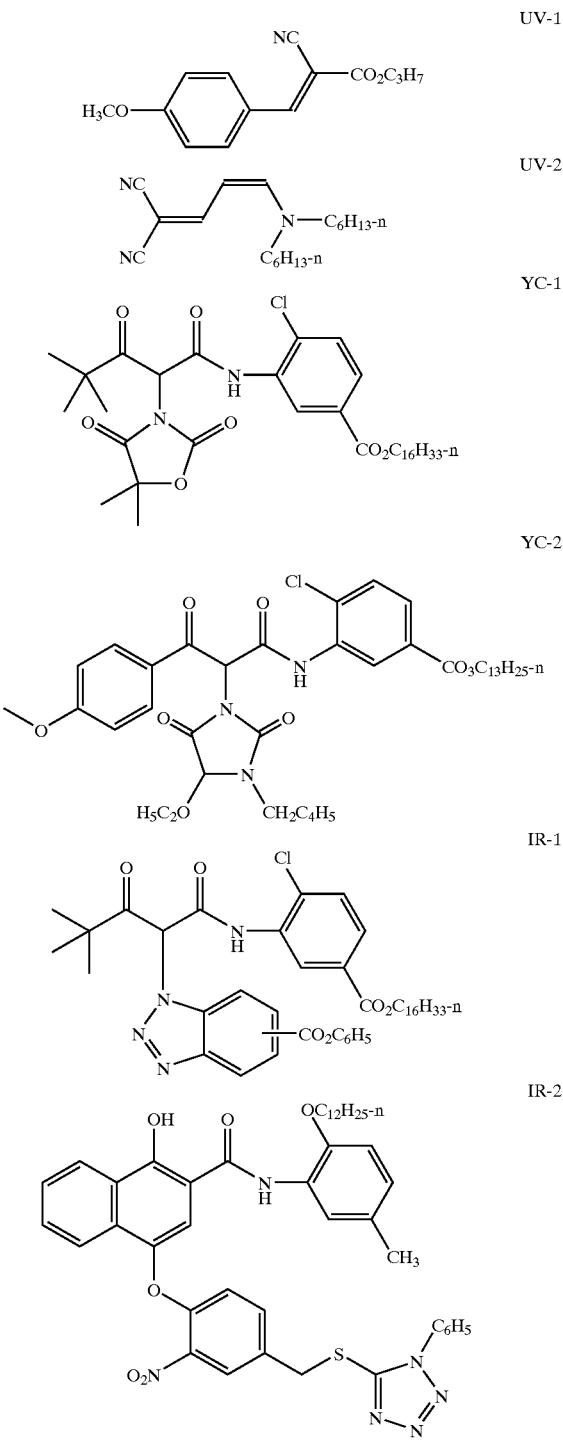

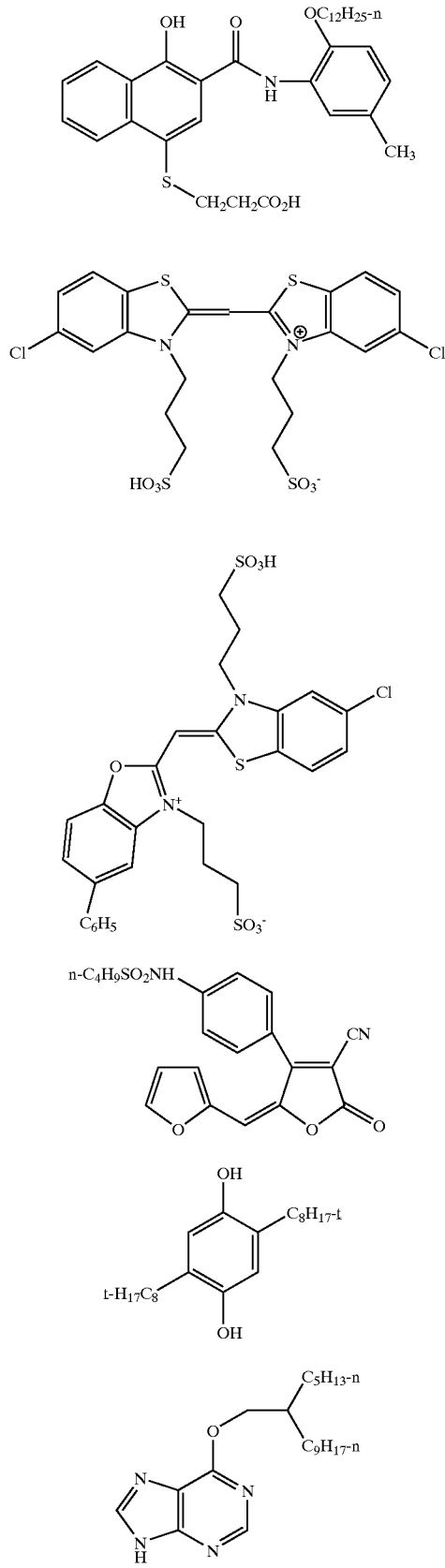
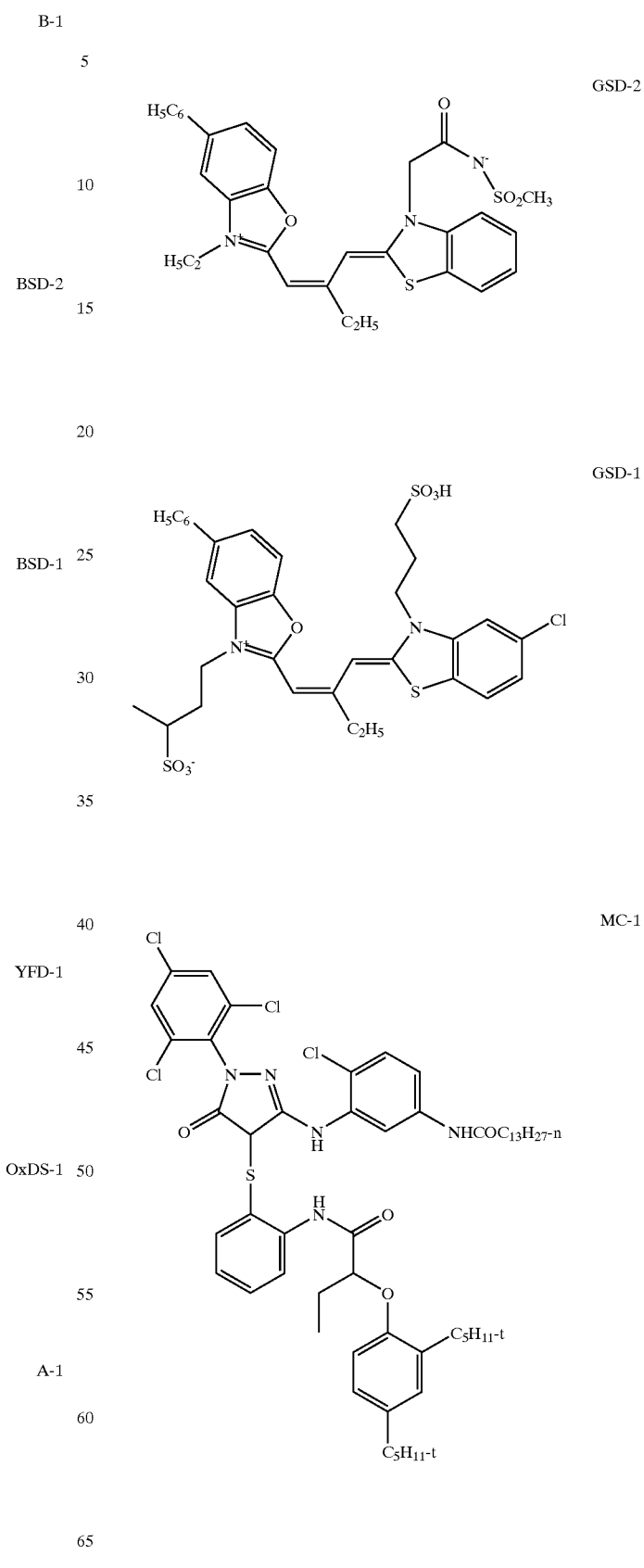

MM-1
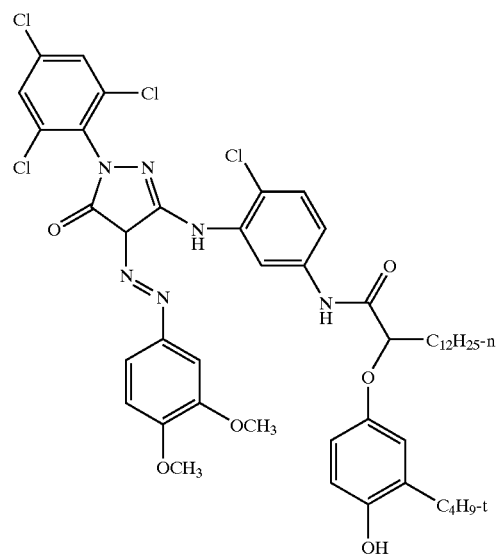
IR-3
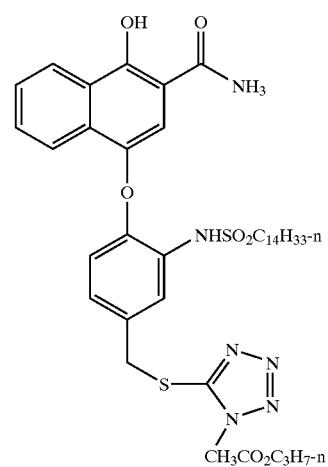
IR-5
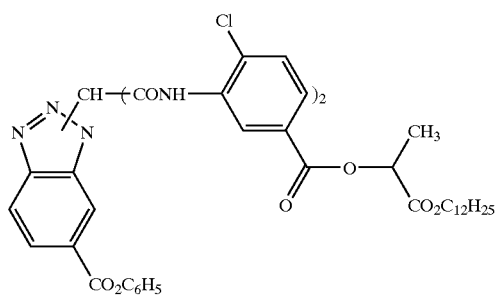
IR-4
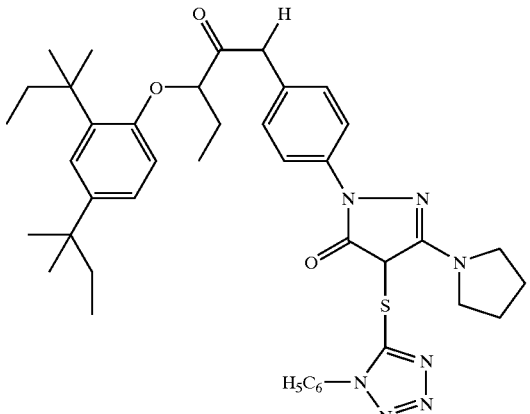
RSD-1
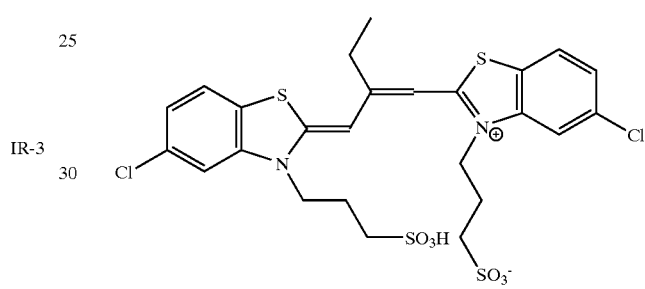
RSD-2
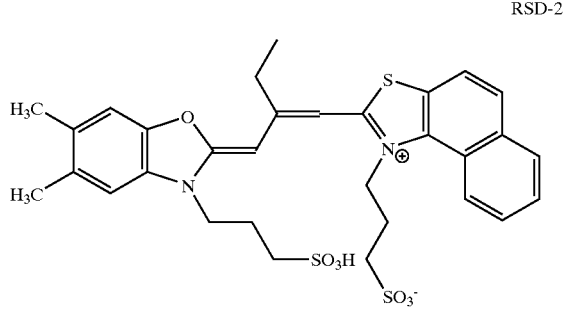
RSD-3
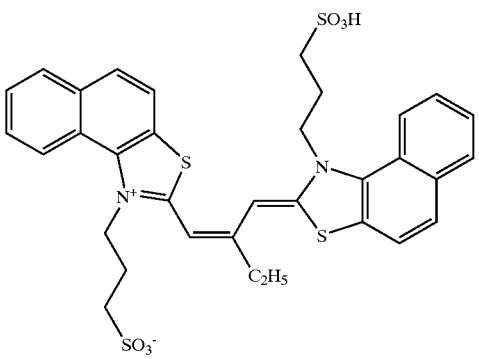

CC-1

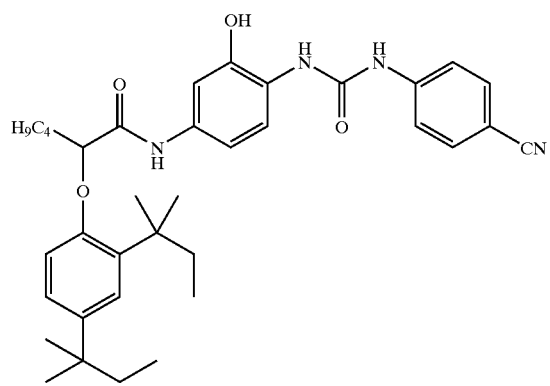

CM-1

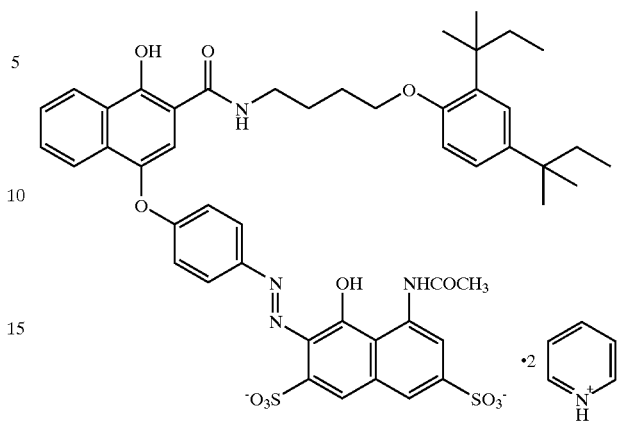

CFD-1

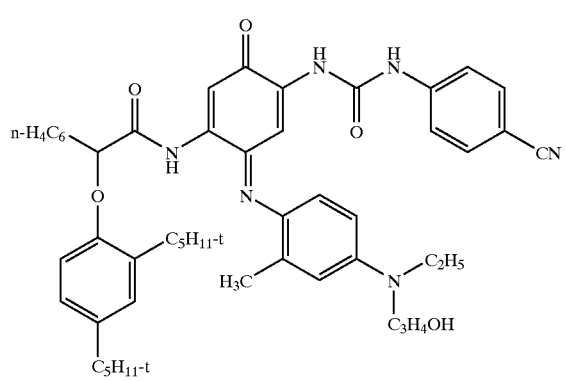

IR-6

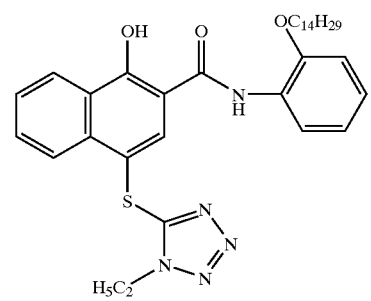

IR-7

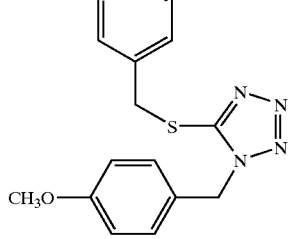

The invention has been described in detail with particular reference to preferred embodiments thereof, but it will be understood that variations and modifications can be effected within the spirit and scope of the invention.

What is claimed is:

1. A gallium halide coordination complex of the formula (I):

$$[R_xNH_y]_3GaX_6$$

wherein R represents a lower alkyl group of from 1–3 carbon atoms; X is Cl, Br, or I; and x is from 1–3, y is from 1–3, and x+y=4.

2. A gallium complex according to claim 1, wherein R represents methyl.

3. A gallium complex according to claim 2, wherein x represents 2.

4. A gallium complex according to claim 3, wherein X represents Br.

5. A gallium complex according to claim 2, wherein X represents Br.

6. A gallium complex according to claim 1, wherein X represents Br.

7. A gallium complex according to claim 1, wherein x represents 2.

8. A process for incorporating gallium in a silver halide emulsion comprising precipitating silver halide emulsion grains in a reaction vessel, wherein a gallium halide coordination complex is introduced into the reaction vessel or formed in situ during precipitation of the silver halide grains, where the gallium halide coordination complex is of the formula (I):

$$[R_xNH_y]_3GaX_6$$

wherein R represents a lower alkyl group of from 1–3 carbon atoms; X is Cl, Br, or I; and x is from 1–3, y is from 1–3, and x+y=4.

9. A process according to claim 8, wherein a preformed gallium halide coordination complex of formula (I) is introduced into the reaction vessel during precipitation of the silver halide grains.

10. A radiation sensitive silver halide emulsion prepared by the process according to claim 8.

11. A radiation-sensitive emulsion according to claim 10, comprised of silver halide grains including tabular grains having {111} major faces and an aspect ratio of at least 2, which contain greater than 50 mote percent bromide, based on silver, and which account for greater than 50 percent of total grain projected area, wherein the gallium complex has been introduced during precipitation of at least a portion of final 50 mol percent of the emulsion grains.

12. An emulsion according to claim 11 wherein the tabular grains contain greater than 70 mole percent bromide and at least 0.25 mole percent iodide, based on silver.

13. An emulsion according to claim 12, wherein X represents Br.

14. A photographic element comprised of a support, and a silver halide emulsion layer coated on the support comprised of an emulsion according to claim 10.

15. A photographic element according to claim 14, wherein the emulsion comprises silver halide grains including tabular grains having {111} major faces and an aspect ratio of at least 2, which contain greater than 50 mole percent bromide, based on silver, and which account for greater than 50 percent of total grain projected area, wherein the gallium complex has been introduced during precipitation of at least a portion of final 50 mol percent of the emulsion grains.

16. A photographic element according to claim 15, wherein the tabular grains contain greater than 70 mole percent bromide and at least 0.25 mole percent iodide, based on silver.

17. A photographic element according to claim 16, wherein X represents Br.

* * * * *